US012140125B2

(12) United States Patent
Frazier et al.

(10) Patent No.: US 12,140,125 B2
(45) Date of Patent: Nov. 12, 2024

(54) SYSTEM AND METHOD TO MAINTAIN VACUUM, OR TO SELECTIVELY EXCLUDE/ADMIT ELECTROMAGNETIC ENERGY

(71) Applicant: Raytheon Company, Tewksbury, MA (US)

(72) Inventors: Gary A. Frazier, Garland, TX (US); Catherine Trent, Allen, TX (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 17/361,505

(22) Filed: Jun. 29, 2021

(65) Prior Publication Data

US 2022/0003222 A1 Jan. 6, 2022

Related U.S. Application Data

(60) Provisional application No. 63/046,953, filed on Jul. 1, 2020.

(51) Int. Cl.
*F03H 1/00* (2006.01)
*B64C 30/00* (2006.01)

(52) U.S. Cl.
CPC ............ *F03H 1/0043* (2013.01); *B64C 30/00* (2013.01)

(58) Field of Classification Search
CPC ...... H01J 41/12; F03H 1/0043; F03H 1/0012; F03H 1/0056
See application file for complete search history.

(56) References Cited

U.S. PATENT DOCUMENTS

| 2008/0028743 | A1* | 2/2008 | Wahl | F03H 1/0012 60/202 |
| 2009/0288385 | A1* | 11/2009 | Metcalfe, III | F03H 1/0037 60/202 |
| 2011/0277444 | A1* | 11/2011 | Leiter | H01J 27/16 60/202 |

OTHER PUBLICATIONS

McGuire "Aero-Assisted Orbital Transfer Vehicles Utilizing Atmosphere Ingestion" (Year: 1999).*

(Continued)

*Primary Examiner* — Arun Goyal
*Assistant Examiner* — William L Breazeal
(74) *Attorney, Agent, or Firm* — Schwegman Lundberg & Woessner, P.A.

(57) ABSTRACT

A conduit is placed between a vacuum system and the open air or other gaseous environment. A laser or other excitation source is used to ionize the air on the air-side of the conduit. An axial applied electric field is used to repel positive ions from traversing the tube and reaching the region of the vacuum. Electrons are collected in the vacuum region and disposed of using a Faraday cup. The repelled ions assist in creating a counter pressure to sweep neutral atoms out of the tube and back into the ambient air. As a result, a hollow tube can connect an evacuated volume to the open air without compromising the vacuum. This is a "windowless window." An array of such tubes can be assembled together to increase the area of the aperture.

17 Claims, 2 Drawing Sheets

(56) References Cited

OTHER PUBLICATIONS

Csiky "Langmuir probe measurements in a SERT II thruster discharge chamber" (Year: 1971).*
Leiter "Design Development and Test of the RIT-µX Mini Ion Engine System" (Year: 2009).*
Wikipedia "Near-infrared spectroscopy" (Year: 2019).*
Young "Plasma Measurements: An Overview of Requirements and Status" (Year: 2008).*
Tallents "An Introduction to the Atomic and Radiation Physics of Plasmas" (Year: 2018).*

* cited by examiner

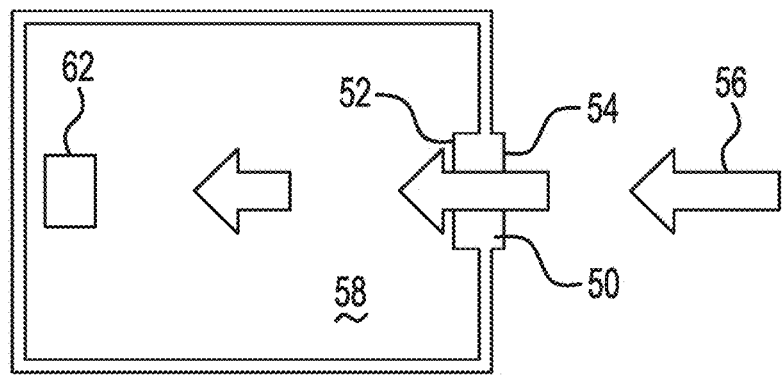
FIG. 4
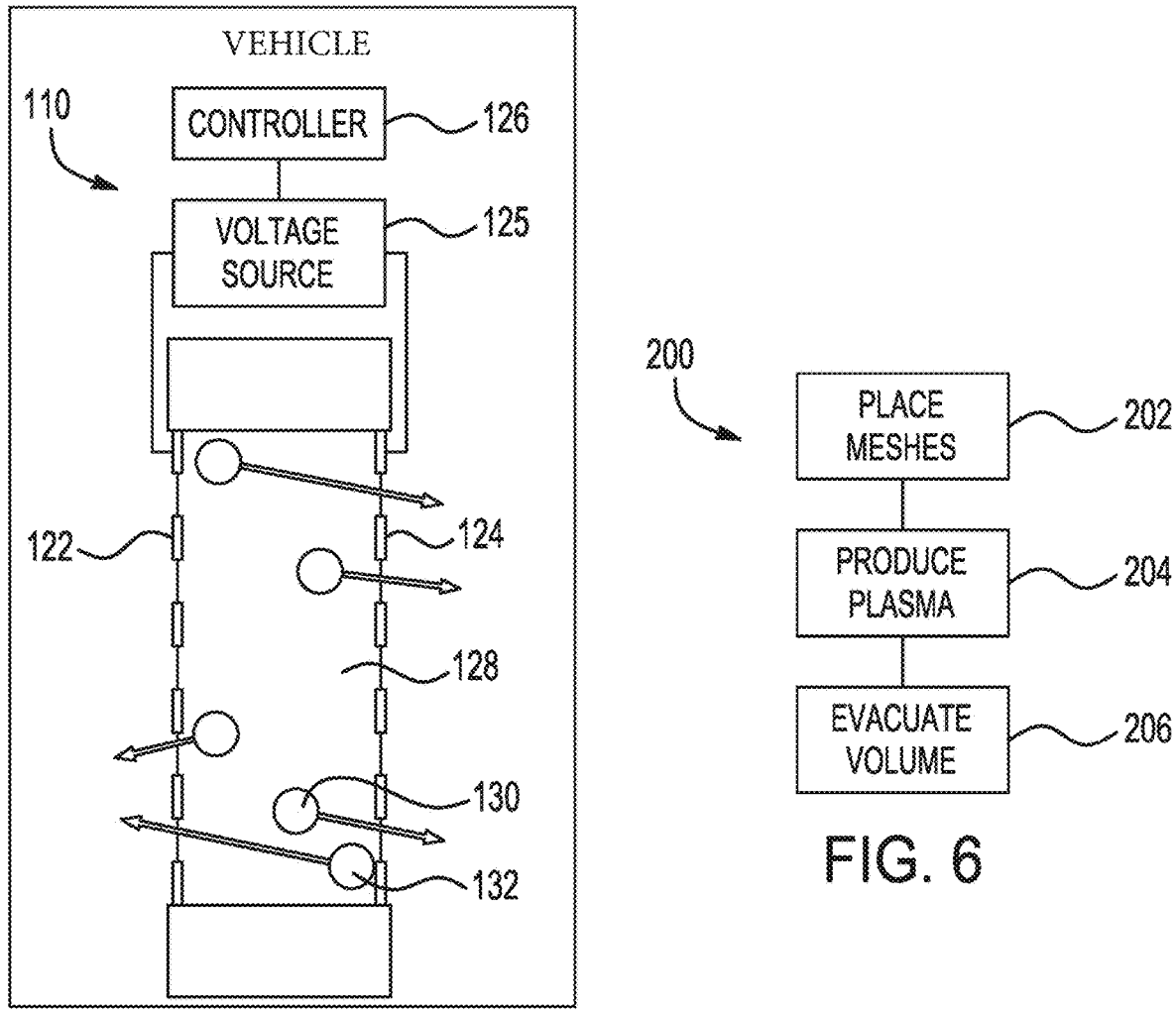
FIG. 5
FIG. 6

SYSTEM AND METHOD TO MAINTAIN VACUUM, OR TO SELECTIVELY EXCLUDE/ADMIT ELECTROMAGNETIC ENERGY

This application claims priority from U.S. Provisional Application 63/046,953, filed Jul. 1, 2020, which is incorporated by reference in its entirety.

FIELD OF THE INVENTION

The invention is in the field of devices and methods for maintaining a vacuum, as well as in the field of devices of selective switches for excluding/admitting electromagnetic energy.

DESCRIPTION OF THE RELATED ART

Massive vacuum pumps can be used to maintain a partial vacuum even in the presence of a leak. There are situations where massive vacuum pumps are impractical and/or undesirable, for various reasons.

In addition (or alternatively), high temperature windows are needed for Electro-Optical/Infrared (EO/IR) sensors. The limiting factor for installing EO/IR sensors on hypersonic weapons and platforms is the window technology.

SUMMARY OF THE INVENTION

This invention solves the problem of operating some instrument or capability that requires a vacuum while also exposing the system to the ambient environment such as the air.

A system and method maintains a vacuum in a region in fluid communication with an open atmosphere or gaseous environment having a positive pressure.

According to an aspect, a plasma vacuum pump is used to maintain a vacuum in a volume in communication with the open air (or atmosphere).

According to another aspect, a windowless solution does not add emissivity to the optical system (allows for a high signal-to-noise ratio (SNR) for the target versus the sensor system).

According to an aspect, a device includes: a pair of screens defining a volume therebetween, wherein the screens are capable of having a voltage difference applied across the screens; and an excitation source capable of ionizing gas in the volume, producing a plasma in the volume.

According to an embodiment of any paragraph(s) of this summary, the screens are metal mesh screens.

According to an embodiment of any paragraph(s) of this summary, the excitation source includes a laser.

According to an embodiment of any paragraph(s) of this summary, the device further includes a voltage source that provides the voltage difference.

According to an embodiment of any paragraph(s) of this summary, the voltage source is a DC voltage source.

According to an embodiment of any paragraph(s) of this summary, the voltage source is an AC voltage source.

According to an embodiment of any paragraph(s) of this summary, the device is a plasma pump.

According to an embodiment of any paragraph(s) of this summary, the device is a windowless window, which allows transmission of energy/radiation therethrough, without solid material in the volume.

According to an embodiment of any paragraph(s) of this summary, the device is a switchable screen to selectively exclude/admit energy/radiation therethrough.

According to an embodiment of any paragraph(s) of this summary, the device further includes a controller operably coupled to the screens, to control the voltage difference.

According to an embodiment of any paragraph(s) of this summary, the device allows substantially constant transmission of energy/radiation therethrough.

According to an embodiment of any paragraph(s) of this summary, the device allows variable transmission of energy/radiation therethrough.

According to an embodiment of any paragraph(s) of this summary, the device maintains a vacuum in a chamber adjacent to the device.

According to an embodiment of any paragraph(s) of this summary, the device further includes a sensor in the chamber.

According to an embodiment of any paragraph(s) of this summary, the sensor is an optical sensor that receives energy/radiation through the screens.

According to an embodiment of any paragraph(s) of this summary, the device further includes one or more additional screens around the screens.

According to an embodiment of any paragraph(s) of this summary, the device is part of a flight vehicle.

According to an embodiment of any paragraph(s) of this summary, the device is part of a hypersonic air vehicle.

According to an embodiment of any paragraph(s) of this summary, a device is used in a method of producing/maintaining a vacuum.

According to an embodiment of any paragraph(s) of this summary, a device is used in a method of selectively admitting/excluding energy/radiation through the device.

According to another aspect of the invention, a method for removing gases from a volume includes the steps of: placing electrically-conductive meshes on opposite sides of the volume; producing a plasma from gasses in the volume; and at least partially evacuating the volume by applying a voltage difference across the meshes, to thereby remove from the volume positive and negative particles of the plasma.

According to an embodiment, the method may be in combination with using an optical sensor within the volume to receive light passing through the meshes.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

FIG. 4 is a schematic view of a device in accordance with another embodiment of the present invention, a "windowless window."

FIG. 5 shows another embodiment, a switchable screen.

FIG. 6 shows a high-level flow chart of a method according to an embodiment of the invention.

DETAILED DESCRIPTION

According to a general embodiment, a conduit is placed between a vacuum system and the open air or other gaseous environment. A laser or other excitation source is used to ionize the air on the air-side of the conduit. An axial applied electric field is used to repel positive ions from traversing the tube and reaching the region of the vacuum. Electrons are collected in the vacuum region and disposed of using a Faraday cup. The repelled ions assist in creating a counter pressure to sweep neutral atoms out of the tube and back into the ambient air. As a result, a hollow tube can connect an evacuated volume to the open air without compromising the vacuum. This is a "windowless window." An array of such tubes can be assembled together to increase the area of the aperture.

The systems and methods described herein have advantages over previous systems and methods. There are electrostatic osmotic pumps that can force fluids in one direction. These are suitable for certain liquids. However the systems and methods described herein work in the open air. The systems and methods allow physical effects generated inside the vacuum system to reach beyond the confines of the vacuum without requiring a window or other physical barrier to prevent ambient gas from entering the vacuum chamber.

It is possible that the systems and methods could be applied to high energy gas discharge laser systems such that an optical window is no longer required between the laser medium and the ambient atmosphere/environment.

Figure 1:
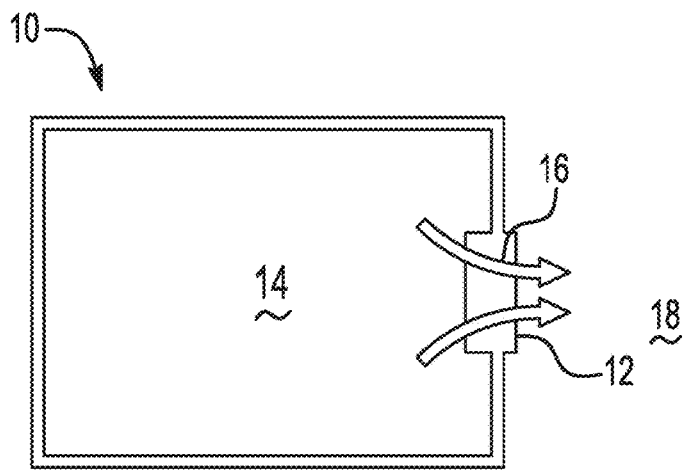
FIG. 1 is a schematic view of a device in accordance with an embodiment of the present invention, a plasma pump as part of a system for creating/maintaining a vacuum.

FIG. 1 shows an operational depiction of a vacuum-maintaining system 10 according to an embodiment of the invention. The system 10 may be part of a hypersonic aircraft, for example. When hypersonic aircraft are flying, the aero flow will cause a pressure differential across a window, for example a window used by a sensor within a sensor bay. The pressure differential may be counteracted by use of a plasma pump 12 to maintain a vacuum in a chamber 14 to be evacuated. This creates a mass flow 16 through the pump 12, from the chamber 14 to an environment 18 on an opposite side of the pump 12 from the chamber 14. The evacuated chamber 14 may be a window or the equivalent of a window, for example used by a sensor that is part of the aircraft. Neutralizing the plasma ions near the platform (aircraft) body will prevent aero-flow and ions entering the sensor bay.

Figure 2:
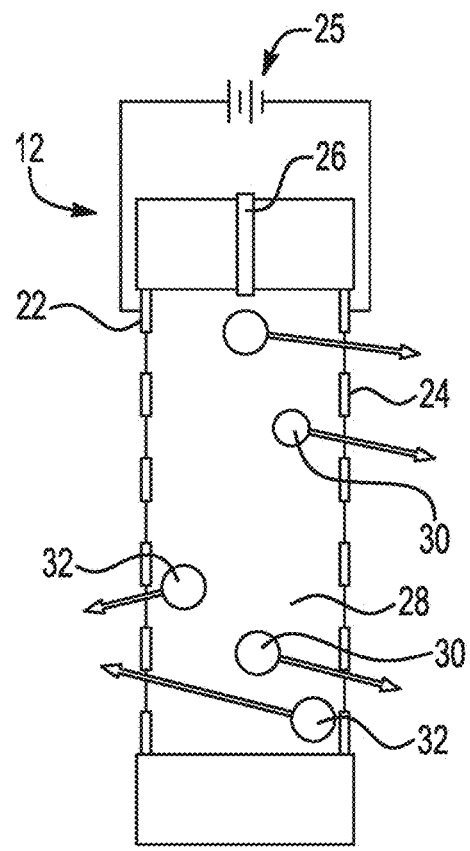
FIG. 2 shows details of one embodiment of the plasma pump of FIG. 1.
Figure 3:
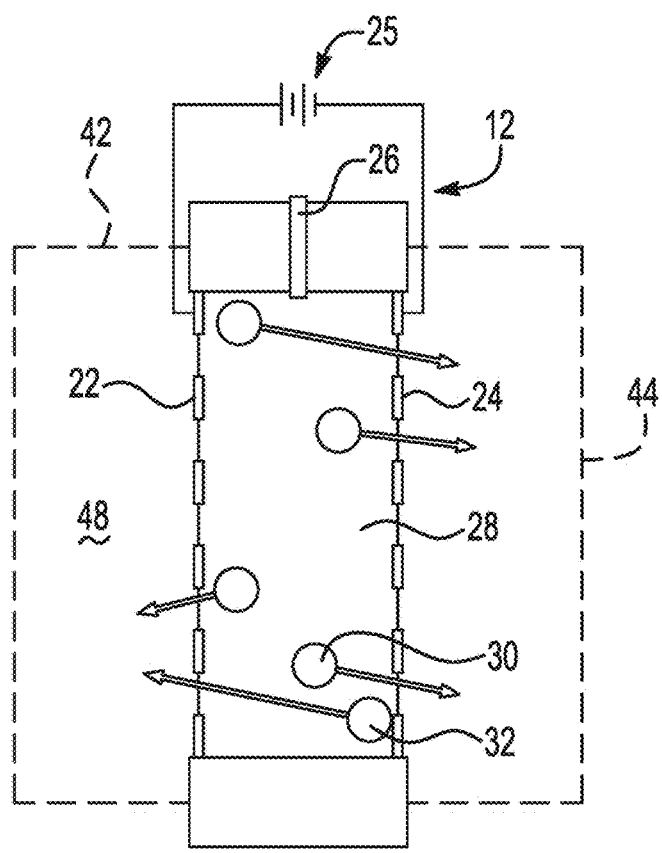
FIG. 3 shows details of another embodiment of the plasma pump of FIG. 1.

FIGS. 2 and 3 illustrate the operation of the plasma pump 12. The core of the system/method is the use of a pair of semi-transparent metal or electrically-conducting mesh screens 22 and 24 ("the mesh") that can be biased to produce an electrical discharge between the screens. With reference to FIG. 2, a direct current (DC) bias is applied between the screens 22 and 24, with the screen (metal mesh) 22 having a high positive voltage applied, and with the screen (metal mesh) 24 having a high negative voltage applied. A voltage source 25 is used to provide the voltage difference across (between) the screens 22 and 24. An excitation source, such as a laser 26, is used to ionize gas in a volume 28 between the screens 22 and 24, to produce a plasma in the volume 28. With the more negative terminal to the right (the screen 24), atoms and molecules entering from either side of the screens 22 and 24 will be ionized, with positive ions 30 driven to the right, out of the volume (space) 28 between the screens 22 and 24. The electrons (negative particles) 32, stripped from the atoms, will be driven to the left. Eventually, all of the molecules in the left volume are moved out. Any molecules entering from the right are returned to the right. A net pressure differential is produced that amounts to a pumping mechanism. This is a net pumping action that either lowers the pressure of a vessel connected to the left side of plasma generator (pump), where the evacuated chamber 14 (FIG. 1) may be located, or simply provides the means to keep molecules that enter from the right from intruding upon the vessel.

The laser 26 used would have a wavelength would be adjusted to resonate with an allowed quantum mechanical transition in the gas. In the case of oxygen and nitrogen molecules this wavelength is in the 0.1 to 0.2 micrometer range. The excitation ejects and electron through photoionization thereby producing free charges which move under the voltage applied across the mesh screens 22 and 24. The breakdown voltage of dry air at sea level is about 80 volts per 0.001" (0.025 mm) of electrode separation. Applying a sufficiently high voltage across the mesh will cause the air to spontaneously breakdown into ions and electrons. The mesh will then separate the charges in the manner described. It is known that sharp points in a metal or conductor cause the breakdown of a gas at a much lover voltage than when the conductor is smooth.

An alternate embodiment includes fabricating the mesh to contain sharp features on the negative electrode, facing the other electrode. An applied voltage will spontaneously eject electrons from these points/edges which when accelerated will ionize the gas between the meshes. This voltage may be much less than 80 volts per 0.001" (0.025 mm) for dry air at standard pressure.

The openings in the mesh sheets 22 and 24 may be chosen to meet optical and RF transparency goals. To be used as an electro-magnetic interference (EMI) blocking mesh, the openings should be less than $\frac{1}{10}$th of a wavelength in extent if high radio frequency (RF) isolation is desired. If RF isolation is not required then the openings are selected for a desired optical transparency. For example, a square wire mesh with 0.001" (0.025 mm) diameter wires and a pitch of 0.01" (0.25 mm) will block $[(0.01-0.001)/(0.01)]^2 = 0.81$ fraction, which means a blockage of 19% of the light passing through the mesh. The mesh wire and pitch may be adjusted to achieve a maximum allowable blockage, depending on the need to pass light through the device.

Turning now in particular to FIG. 3, additional metal meshes (metal screens) 42 and 44 may be placed around the screens 22 and 24. The additional metal meshes 42 and 44 provide neutralization of ions created by the plasma pump 12. In the illustrated embodiments the positive ions travel rightward and impact the metal screen 44 to the right and neutralize. The negative electrons strike the metal mesh 42 at the left and are neutralized, flowing into the metal mesh 42. This prevents electrons from charging up the interior of evacuated volume 48. The neutral molecules in the left volume 48 can still diffuse through the metal mesh 22 and be ionized.

With reference now to FIG. 4, the system 10 (FIG. 1) may be considered, instead of as a pump, as an optical window 50 that is composed of metal screens 52 and 54. Light 56 entering the volume 58 from the right will not be absorbed by a solid window because a solid window pane does not exist. As a result, except for the obscuration of the plasma screens 52 and 54 the window 50 has no loss from the deep UV to the far Infrared. The window 50 is a windowless window, so to speak, in that the window 50 is empty space, pumped free of particles, as opposed to a solid material. The pump excludes the high-pressure air that a window must normally stand off.

Note that the external air can be very hot, in situations like those surrounding a hypersonic aircraft. The plasma pump prevents this hot gas from entering the sensor chamber. Often these gases are themselves ionized. This assists the plasma pump in that no added ionization mechanism is required to pump these particles.

The window 50 may be used in connection with a sensor 62, such as an optical sensor or (more broadly) any of a variety of Electro-Optical/Infrared (EO/IR) sensors. Non-limiting examples of such sensors include single detector pixel sensors (light meters), linear array sensors, and 2-D focal plane array sensors. Many other suitable sensors are possibilities for the sensor 62. The sensor 62 is located in the chamber 58, able to receive light/radiation, such as UV through far infrared from a target, through the plasma pump or windowless window 50. The plasma density within the window 50 may be adjusted to provide transmission of light/radiation at desired wavelengths, such as a desired range of wavelengths.

Another possible use of a window as described herein is in connection with a laser (or other light source) that has emission that might be blocked (or greatly reduced or negatively impacted) by a solid (or more substantial) window of any substance. This may be useful (to give a non-limiting example) for providing an exit aperture in a gaseous environment for deep ultra-violet lasers whose radiation would otherwise be absorbed or scattered by a window of substance.

The systems described above may have several advantages, relative to previous approaches. They may enable a window for use at hypersonic speeds, that is transparent (or substantially transparent) to a wide variety of wavelengths/frequencies of light/radiation, for example ultraviolet (UV) through long-wave infrared (LWIR) frequencies. A windowless sensor system design may be enabled. A sensor window design or configuration may be adaptable for different platforms and/or different geometries. Further, dynamic and instantaneous pressure differential control may be enabled.

Systems and methods as described above provides the means to prevent hazardous or undesirable gas from passing from the right to the left through the two screens, in reference to the figures described earlier. It will be appreciated "right" and "left" stand in here for directions on opposite sides of the plasma pump or windowless window, and that such opposite directions may have many different orientations. This provides a method to prevent ingress of undesirable gas while also passing molecules from the left to the right.

This provides the means for a windowless window, where an optical sensor placed at the left of the screens can view the outside environment, through the plasma sheath, without requiring an intervening solid window to prevent gas flow. Such a window would be transparent at any wavelengths that are transparent to the gases involved. Generally, gases at modest pressure are transparent from the ultraviolet through the long wave infrared (LWIR). As a result, this invention provides for a window useful to any optical sensor in the UV through LWIR as it provides for a low optical loss.

The density of the plasma may be adjusted by controlling the electrical bias to ensure that most or all of the molecules that would otherwise diffuse through the plasma screens will be ionized.

The systems and methods provide a windowless solution does not add the normal optical emissivity characteristic of a solid window to the optical system (allows for a high signal-to-noise ratio (SNR) for the target versus the sensor system). It provides advantages over prior approaches to cooling windows and avoiding window heating in hypersonic systems (for example), such prior (other) approaches as: 1) micro cooling channels, which may work well at lower temperature systems, but not at higher temperatures, such as for systems at >600° C.; 2) shock wave detachment and reattachment post window, which is not always applicable for high speed hypersonic platforms; 3) film cooling, with flow over the window to cool, which adds emissivity to the system due to the coolant emission; and 4) cladding cooling using channel(s), in which there is cooling of the complete field behind a thin membrane, which is susceptible to thermal gradients.

Other uses are possible for the systems/devices described above. Radio frequency (RF) energy will traverse a coarse metallic screen (e.g., chicken wire mesh) at certain RF frequencies. RF energy will pass through a metal screen if the wavelength of the RF energy is shorter than one-half the pitch of the screen (assumes a square mesh screen). The mesh or screen acts as a high-pass filter for RF energy. Plasma has a characteristic frequency called the plasma frequency such that RF energy of wavelengths longer than this critical value will be totally reflected by such a plasma. In an embodiment, a pair of coarse screens (such as the screens 22 and 24 shown in FIG. 2) may be used to establish the plasma. When the bias is removed, RF energy will propagate through the screen due to the above-described "wire pitch" effect. When the bias is applied, the plasma density may be adjusted by controlling the electrical power delivered to the contained gas such that the plasma frequency is raised to a value that causes the incident RF energy to be reflected. In summary, the system described provides not only a pumping mechanism, and the possibility of an ultra-wideband optical window, but also provide the means to alternatively admit or reject RF energy of selected wavelengths.

Thus the structure described above as a plasma pump may alternatively be employed as part of a switchable screen to programmably exclude or admit electromagnetic energy. Such a switchable screen 110 is shown in FIG. 5, where meshes (screens) 122 and 124 are coupled to a voltage source 125, which in turn is controlled by a controller 126 that controls application of (for example) positive and negative DC (or alternating current (AC)) voltages to the screens 122 and 124. The voltage on the screens 122 and 124 is used to controllably remove positive and negative particles 130 and 132 from a volume 128 between the screens 122 and 124.

The controller 126 may have various implementations. For example, the controller 126 may include any suitable device, such as a processor (e.g., CPU), programmable circuit, integrated circuit, memory and I/O circuits, an application specific integrated circuit, microcontroller, complex programmable logic device, other programmable circuits, or the like. The controller 126 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the controller 126. The controller 126 may be communicatively coupled to the computer readable medium through a system bus, mother board, or using any other suitable structure known in the art.

Such a system can be used to selectively permit RF energy to be emitted from the left to the right, as in the case of a periodically actuated RF transmitter, or block this energy from leaving the left side of an enclosure which has incorporated the plasma screens as part of the enclosure wall. Or electromagnetic signals may be programmably admitted to reflected from the plasma screens when incident from the right side of the system. Applications include programmable EMI (electromagnetic interference) screens, and programmable RF reflectors as part of an antenna system which uses reflectors to direct RF energy.

There are applications where the plasma would normally be operating except for very short periods of time. During this special time period, the plasma bias would be removed and RF energy allowed to pass through the screens. The bias would then be re-applied to maintain the pumping action, and RF exclusion action, of the plasma.

For example consider a plasma system where the screens are 1-inch apart. Molecules will diffuse through the screens at the speed of sound or 300 m/s. It takes 85 microseconds for a gas molecule to diffuse across the screens at one standard atmosphere of pressure. A radio wave can travel 25,000 meters in this time. In principle the plasma could be interrupted for about 80 microseconds to allow RF energy to pass through the screens, then re-activated to re-establish the RF isolation between the two sides of the plasma system.

For a situation where the plasma is desired for its RF properties but the pumping action is not required, it would desirable to bias the plasma screens using AC power. This would maintain the plasma but not bias the ionized molecules in the plasma toward one screen or the other. The frequency of the AC excitation would be adjusted as required to maintain the plasma. Often this frequency is in the MHz range. The field reverses much too fast for molecules to diffuse very far from the plasma between excitation cycles.

It is advantageous to use a plasma vacuum pump to provide both optical and RF properties in the same aperture. Use of a mesh and a plasma in a system that is open to the ambient air is also novel and advantageous.

FIG. 6 shows a high-level flow chart of a method 200 using the devices described above. In step 202 electrically-conductive meshes are placed on opposite sides of an enclosed volume. In step 204 a plasma is produced in the volume, for example using an excitation source such as a laser. In step 206, the volume is at least partially evacuated by applying a voltage difference across the meshes, to thereby remove from the volume positive and negative particles of the plasma.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A device comprising:
a pair of screens including a first screen and a second screen, the first screen including a first screen first side, a first screen second side that opposes the first screen first side, and first holes extending between the first screen first side and the first screen second side, the second screen including a second screen first side, a second screen second side that opposes the second screen first side, and second holes extending between the second screen first side and the second screen second side, the first screen second side facing the second screen first side, a space between the first screen second side and the second screen first side defining a volume therebetween, wherein a voltage source is configured to apply a voltage difference across the pair of screens,
a vacuum chamber external to and situated on the second screen second side, wherein the vacuum chamber is configured to be in fluid communication with an atmosphere only through the pair of screens, the atmosphere external to and on the first screen first side;
an excitation source capable of ionizing a gas in the volume so as to produce a plasma in the volume, the excitation source situated to provide light to ionize the gas in the volume and
an electro-optical/infrared (EO/IR) sensor within the chamber that receives energy/radiation through the screens.

2. The device of claim 1, wherein the pair of screens are metal mesh screens.

3. The device of claim 1, wherein the excitation source includes a laser.

4. The device of claim 1, wherein the voltage source is a DC voltage source.

5. The device of claim 1, wherein the voltage source is an AC voltage source.

6. The device of claim 1, wherein the pair of screens is configured to selectively exclude/admit energy/radiation therethrough.

7. The device of claim 6, further comprising a controller operably coupled to the pair of screens, to control the voltage difference.

8. The device of claim 1, wherein the pair of screens is configured to allow constant transmission of energy/radiation therethrough.

9. The device of claim 1, wherein the pair of screens is configured to allow variable transmission of energy/radiation therethrough.

10. The device of claim 1, wherein the pair of screens is configured to maintain a vacuum in the vacuum chamber.

11. The device of claim 1, further comprising one or more additional screens around the pair of screens.

12. The device of claim 1, wherein the device is mounted to a flight vehicle.

13. The device of claim 1, wherein the device is mounted to a hypersonic air vehicle.

14. The device of claim 1, wherein the EO/IR sensor is a focal plane array sensor.

15. The device of claim 1, wherein the EO/IR sensor is a linear array sensor.

16. A method for removing gasses from a volume, the method comprising:

placing a pair of meshes that are electrically-conductive on opposite sides of the volume, the pair of meshes including a first mesh and a second mesh, the first mesh including a first mesh first side, a first mesh second side opposite the first mesh first side, and first holes extending between the first mesh first side and the first mesh second side, the second mesh including a second mesh first side, a second mesh second side opposite the second mesh first side, and second holes extending between the second mesh first side and the second mesh second side, the first mesh second side facing the second mesh first side, the volume situated between the first mesh second side and the second mesh first side, providing a vacuum chamber on the second mesh second side, wherein the vacuum chamber is configured to be in fluid communication with an atmosphere through the first mesh and the second mesh;

providing in the chamber an electro-optical/infrared (EO/IR) sensor;

producing a plasma from gasses in the volume by providing ionizing light in the volume; and at least partially evacuating the volume by applying a voltage difference across the first mesh and the second mesh, to thereby remove from the volume positive and negative particles of the plasma.

17. The method of claim 16, in combination with using the electro-optical/infrared (EO/IR) sensor within the volume to receive radiation passing through the first mesh and the second mesh.

* * * * *